United States Patent [19]

Lanier et al.

[11] Patent Number: 5,521,373
[45] Date of Patent: May 28, 1996

[54] POSITION TRACKING SYSTEM USING A RADIATION DIRECTOR WHICH DIRECTS RADIATION FROM A RADIATION SOURCE ONTO A RADIATION SENSOR, DEPENDING ON THE POSITION OF THE RADIATION SOURCE

[75] Inventors: Jaron Z. Lanier, Palo Alto; Jean-Jacques G. Grimaud; Michael A. Teitel, both of Portola Valley; Mark L. Oberman, Sunnyvale; Young L. Harvill, San Mateo, all of Calif.

[73] Assignee: VPL Research, Inc., Redwood City, Calif.

[21] Appl. No.: 165,044

[22] Filed: Oct. 6, 1993

Related U.S. Application Data

[63] Continuation of Ser. No. 854,769, Mar. 20, 1992, abandoned, which is a continuation of Ser. No. 562,090, Aug. 2, 1990, abandoned.

[51] Int. Cl.$^6$ ................................................. G01C 21/02
[52] U.S. Cl. .............................. 250/203.2; 250/206.2; 356/141.3; 356/141.5
[58] Field of Search ..................... 250/203.4, 203.2, 250/206.1, 206.2; 356/141.1, 141.2, 141.3, 141.4, 141.5, 152.1, 152.2, 152.3

[56] References Cited

U.S. PATENT DOCUMENTS

| | | | |
|---|---|---|---|
| H412 | 1/1988 | Miller, Jr. et al. | 250/203 R |
| 3,413,515 | 11/1968 | Haring . | |
| 3,651,508 | 3/1972 | Scarborough, Jr. et al. . | |
| 3,858,201 | 12/1974 | Foster | 340/347 P |
| 4,086,485 | 4/1978 | Kaplow et al. | 250/203 R |
| 4,193,689 | 3/1980 | Reymond et al. | 356/152 |
| 4,314,761 | 2/1982 | Reymond et al. | 356/141 |
| 4,329,684 | 5/1982 | Monteath et al. . | |
| 4,367,465 | 1/1983 | Mati et al. . | |
| 4,521,772 | 6/1985 | Lyon . | |
| 4,550,250 | 10/1985 | Mueller et al. . | |
| 4,565,999 | 1/1986 | King et al. . | |
| 4,576,481 | 3/1986 | Hansen . | |
| 4,626,100 | 12/1986 | Johnson | 356/152 |
| 4,857,721 | 8/1989 | Dunavan et al. | 250/203 R |
| 4,914,283 | 4/1990 | Brinckmann et al. | 250/206.01 |

OTHER PUBLICATIONS

M. Sakaguchi and N. Nishida; "The Hologram Tablet–A New Graphic Input Device"; Fall Joint Computer Conference, 1970; pp. 653–658.

*Primary Examiner*—Edward P. Westin
*Assistant Examiner*—Steven L. Nichols
*Attorney, Agent, or Firm*—Oblon, Spivak, McClelland, Maier & Neustadt

[57] ABSTRACT

A radiation source directs radiation toward a radiation sensor in such a way that the intensity of radiation sensed by the radiation sensor alternates in a periodic manner as the radiation source moves radially relative to the radiation sensor. The radiation sensor generates either a "1" or a "0" depending upon whether the intensity of the radiation sensed by the radiation sensor is above or below a particular reference value. Thus, the angular position of the radiation source relative to the radiation sensor is indicated by an alternating series of "1"s and "0"s. A multi-bit binary value which indicates the absolute position of the radiation source relative to the radiation sensor can be generated. In this case, a band of radiation is directed toward the radiation sensor. The radiation band is separated into a plurality of portions, the intensity of each successive portion being twice the frequency of the preceding portion. Each portion of the radiation band impinges upon a corresponding sensor. The signal generated by each sensor element is thus one bit of a multi-bit binary value which varies as the radiation source moves radially relative to the radiation sensor.

2 Claims, 7 Drawing Sheets

FIG. 10A
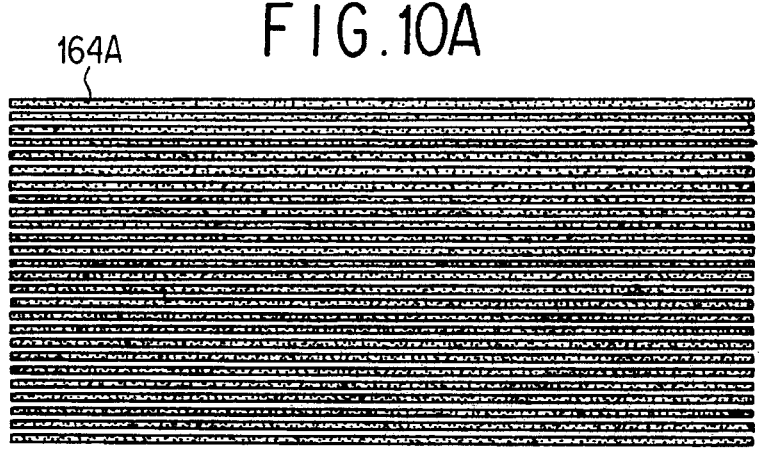
FIG. 10B
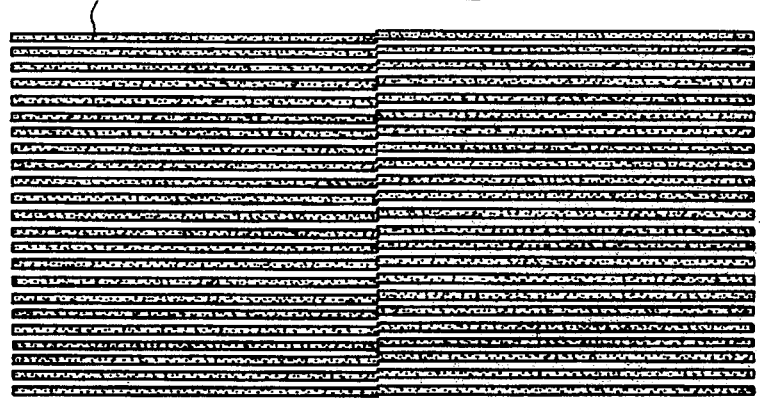
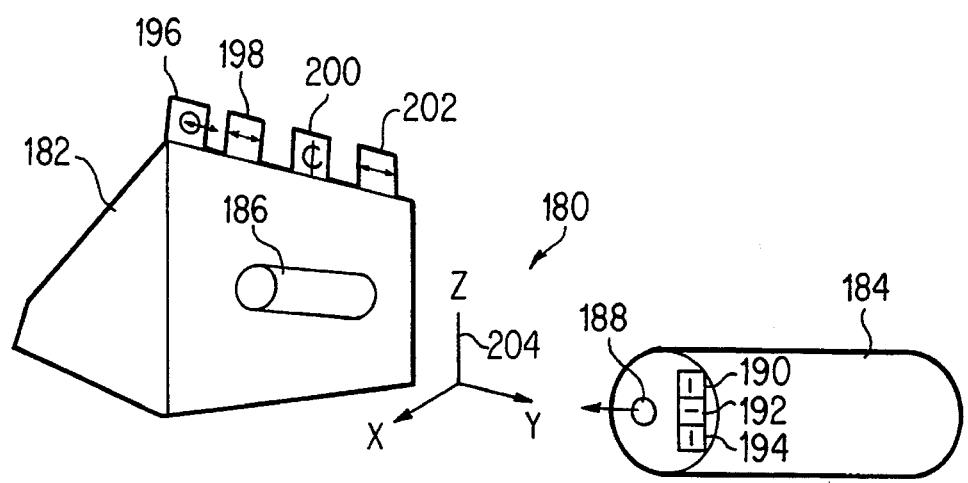
FIG. 11

POSITION TRACKING SYSTEM USING A RADIATION DIRECTOR WHICH DIRECTS RADIATION FROM A RADIATION SOURCE ONTO A RADIATION SENSOR, DEPENDING ON THE POSITION OF THE RADIATION SOURCE

This is a continuation of application Ser. No. 07/854,769, filed on Mar. 20, 1992, now abandoned, which is a continuation of Ser. No. 07/562,090, filed Aug. 2, 1990, now abandoned.

BACKGROUND OF THE INVENTION

This invention relates to position tracking systems, and, more particularly, to a system for detecting the angular position of a radiation source with respect to a radiation sensor.

It is known to sense a radiation source with a radiation sensor for measuring the relative position of the two. For example, U.S. Pat. No. 4,550,250 issued to Mueller, et al., discloses a system for detecting the position of a radiation source on a surface. This system employs a triangular-shaped detector fixedly positioned behind a slit aperture. Radiation from a radiation source passes through the slits and to the detector. As the radiation source moves in a plane (for example, along the surface of a table), the analog output signal from the triangular detector varies in proportion to the angle between the detector and the radiation source. The analog output from the detector is compared to a reference signal and digitized. The digital signals are then processed to determine the relative angle between the detector and the radiation source. The position of the radiation source in the plane is then calculated by triangulation.

Other known devices focus a point source of radiation onto an analog detector. The detector generates a pair of analog signals which are proportional to the angle of the detector with respect to the source in each of two orthogonal directions. Combinations of two or more of these analog detectors can be used to calculate the position and orientation of objects using triangulation algorithms.

In each case the analog output signal must be passed through an analog to digital converter and be subjected to significant additional processing. Each process step also limits the resolution Of the system, thus making fine measurements very difficult, if not impossible.

SUMMARY OF THE INVENTION

The present invention is directed to a system for directly detecting the angular position of a radiation source with respect to a radiation sensor. The present invention eliminates the need for analog to digital converters and excessive signal processing, thus maintaining high resolution for fine measurements.

In one embodiment of the present invention, a radiation source directs radiation toward a radiation sensor in such a way that the intensity of radiation sensed by the radiation sensor alternates in a periodic manner as the radiation source moves radially relative to the radiation sensor. The radiation sensor generates either a "1" or a "0" depending upon whether the intensity of the radiation sensed by the radiation sensor is above or below a particular reference value. Thus, the angular position of the radiation source relative to the radiation sensor is indicated by an alternating series of "1"s and "0"s.

The teachings of the present invention may be extended to the generation of a multi-bit binary value which indicates the absolute position of the radiation source relative to the radiation sensor. In this case, a band of radiation is directed toward the radiation sensor. The radiation band is separated into a plurality of portions, the intensity of each successive portion being twice the frequency of the preceding portion. Each portion of the radiation band impinges upon a corresponding sensor. The signal generated by each sensor element is thus one bit of a multi-bit binary value which varies as the radiation source moves radially relative to the radiation sensor.

BRIEF DESCRIPTION OF THE DRAWINGS

FIGS. 10A–10B are diagrams of an alternative embodiment of a radiation patterning unit according to the present invention; and FIG. 11 is a perspective view of one application of the present invention applied to cursor control within a computing system.

DETAILED DESCRIPTION OF THE PREFERRED EMBODIMENTS

Figure 1:
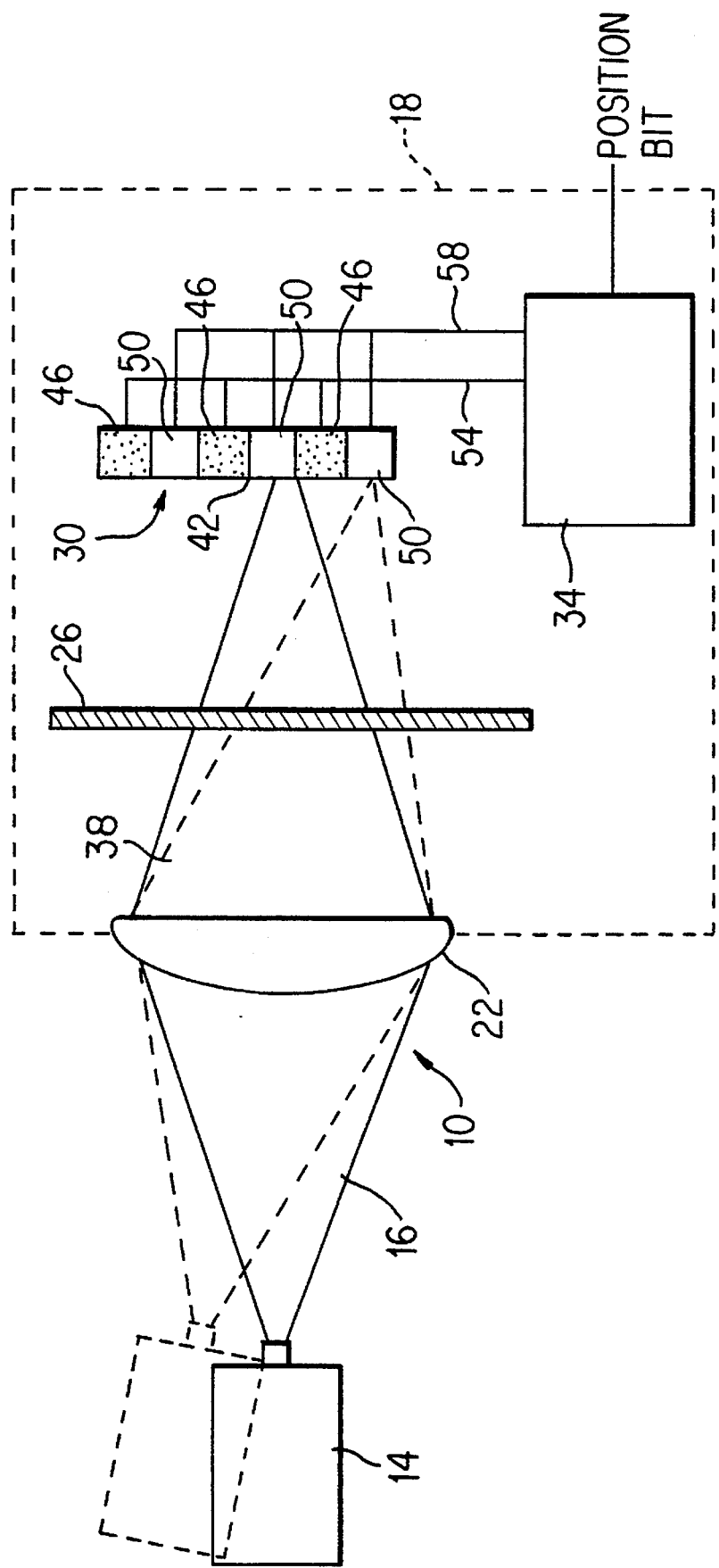
FIG. 1 is a side cross-sectional view of a particular embodiment of a position tracking system according to the present invention.

FIG. 1 is a side cross-sectional view of a particular embodiment of a position tracking system 10 according to the present invention. Position tracking system 10 comprises a radiation source 14 for emitting radiation 16 and a position detector 18 for detecting the relative position of radiation source 14. Radiation source 14 may be a self-luminous object such as a heat source, an object which normally emits radiation, or it may be a radiation source attached to an object which does not normally emit radiation. The intensity of the radiation source may be modulated in a known way in order to facilitate noise reduction in position detector 18. Radiation 16 may be coherent or incoherent and may have a wave length inside or outside the visible spectrum.

In this embodiment, position detector 18 includes a cylindrical lens 22, a filter 26, a radiation sensor 30, and a position data generator 34. Cylindrical lens 22 directs a discrete beam of radiation 38 through filter 26 and toward a surface 42 of radiation sensor 30. Filter 24 eliminates radiation of different wave lengths other than the wave length of interest.

Radiation sensor 30 comprises a plurality of first sensing elements 46 and a plurality of second sensing elements 50. Sensing elements 46 and 50 alternate with each other as shown for defining surface 42. The plurality of first sensing elements 46 are coupled to position data generator 34 through a line or lines 54, and the plurality of second sensing elements 50 are coupled to position data generator 34 through a line or lines 58. Radiation sensor 30 may operate in a number of different ways. In general, beam 38 moves along surface 42 as radiation source 14 move relative to position detector 18 as shown in phantom in FIG. 1. For example, if beam 38 broadly impinges upon surface 42, then the radiation sensed by sensing elements 46 may be compared to the radiation detected by sensing elements 50. If a sensing element 46 receives more radiation than a sensing element 50, then position data generator 34 generates a "0." On the other hand, if a sensing element 50 receives more radiation than a sensing element 46, then position data generator 34 generates a "1." If beam 38 is narrowly focused, then position data generator 34 may generate a "0" whenever the narrow beam impinges upon a sensor element 46 and generate a "1" whenever the narrow beam impinges upon senses element 50. Another possibility is to remove sensing elements 50 while maintaining sensing elements 46 in a spaced apart relation. In this case, position data generator 34 generates a "0" whenever radiation is detected by a sensing element 46 and generates a "1" otherwise.

Figure 2:
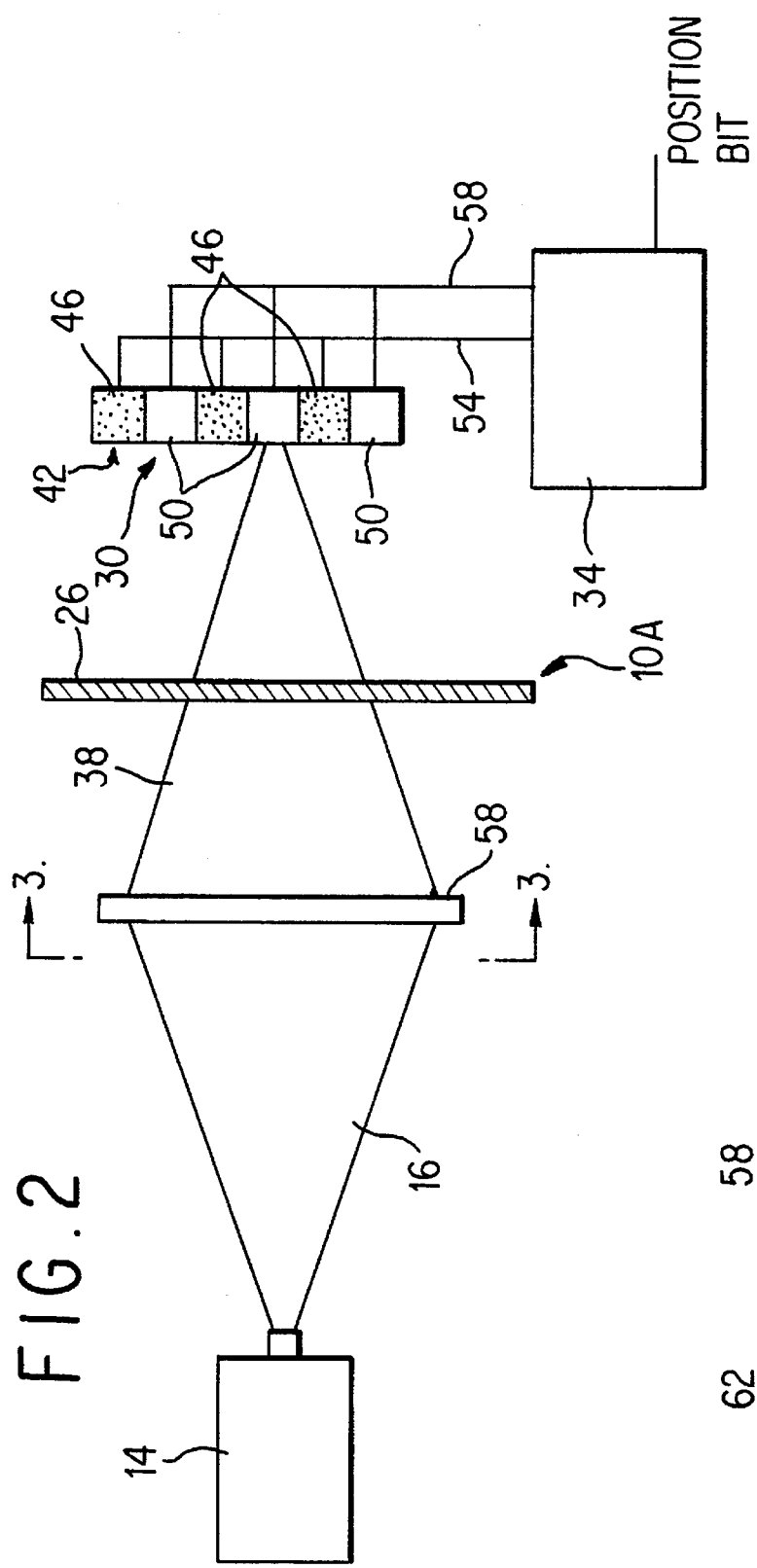
FIG. 2 is a side cross-sectional view of an alternative embodiment of a position tracking system according to the present invention.
Figure 3:
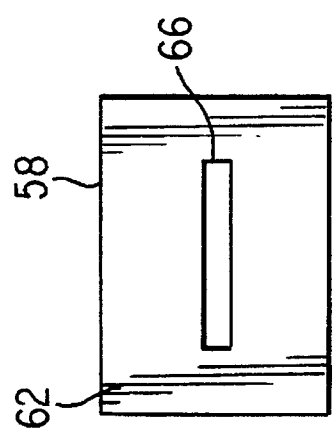
FIG. 3 is a view of a particular embodiment of a radiation directing unit taken along line 3—3 of FIG. 2.

FIG. 2 is a side cross-sectional view of an alternative embodiment of a position tracking system 10A according to the present invention. The components in position tracking system 10A are the same as the components in position tracking system 10 of FIG. 1 except that cylindrical lens 22 has been replaced by a grating 58. As shown in FIG. 3, grating 58 comprises a radiation opaque portion 62 and a radiation transparent portion 66. Radiation transparent portion 66 typically is formed as a slit, although it could also be formed as a point.

Figure 4:
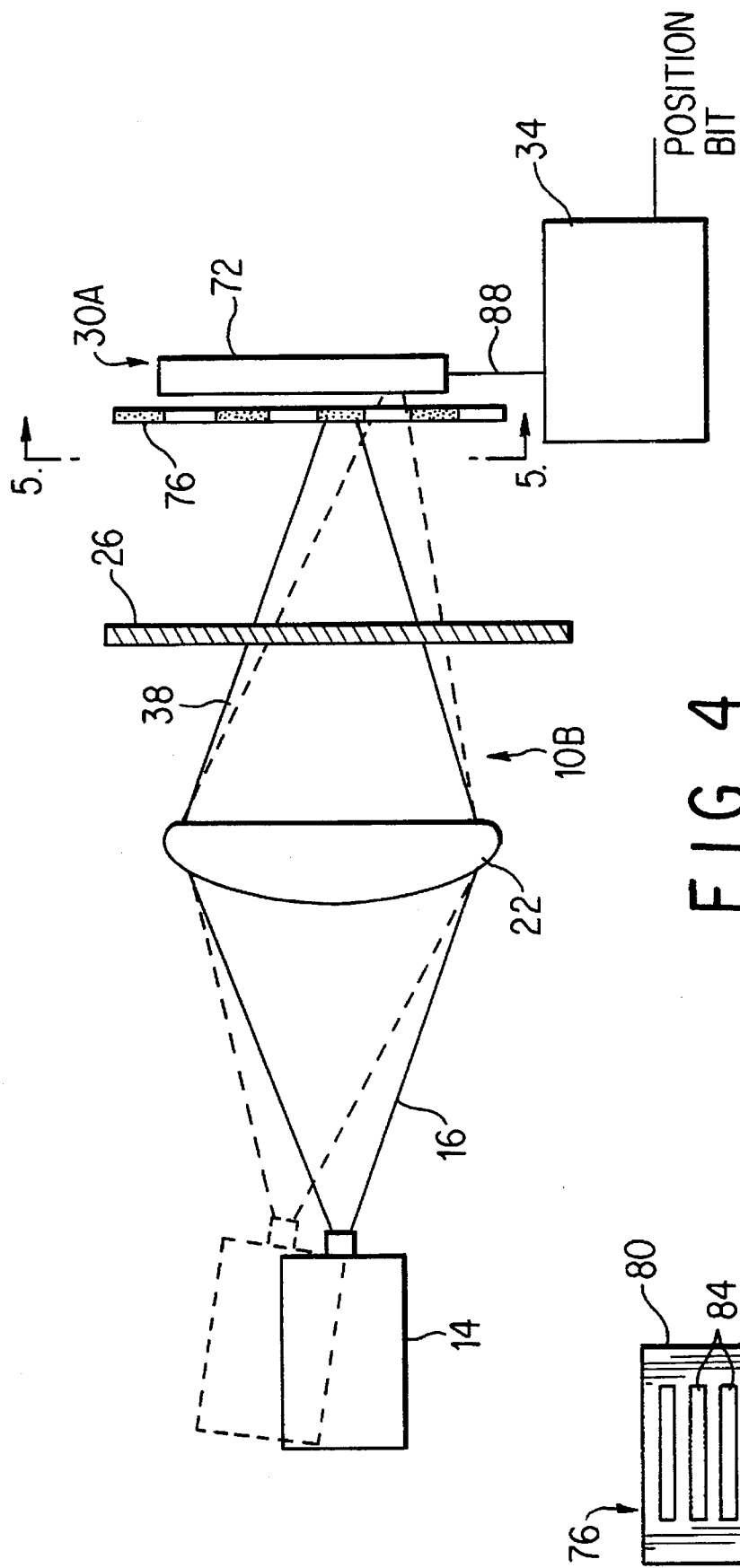
FIG. 4 is a side cross-sectional view of another alternative embodiment of a position tracking system according to the present invention.
Figure 5:
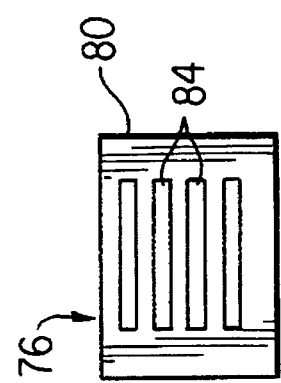
FIG. 5 is a view of a radiation directing unit taken along line 5—5 of FIG. 4.

FIG. 4 is side cross-sectional view of another alternative embodiment of a position tracking system 10B according to the present invention. This embodiment is similar to the embodiment shown in FIG. 1 except that radiation sensor 30 comprises a single sensor element 72 and a grating 76. As shown in FIG. 5, grating 76 comprises a radiation opaque member 80 having a plurality of radiation transparent regions 84 disposed therein. Thus, when radiation source 14 is in the position shown with solid lines in FIG. 4, beam 38 impinges upon a radiation opaque portion of grating 76, and sensor 72 does not detect any radiation. However, when radiation source 14 has moved radially to the position shown in phantom in FIG. 4, then beam 48 is directed toward one of the radiation transparent portions 84 in grating 76, and the beam impinges upon sensor 72 which thereupon communicates a signal to position data generator 34 over a line 88. Position data generator 34 is adapted to generating "0" when no radiation is sensed by sensor element 72 and to generate a "1" when radiation is sensed by sensor element 72. Of course, the radiation sensed by sensor element 72 may be compared to a reference value which must be exceeded before a "1" is generated by position data generator 34. Radiation sensor 30A may be used in place of radiation sensor 30 in the embodiment shown in FIG. 2 as well.

Figure 6:
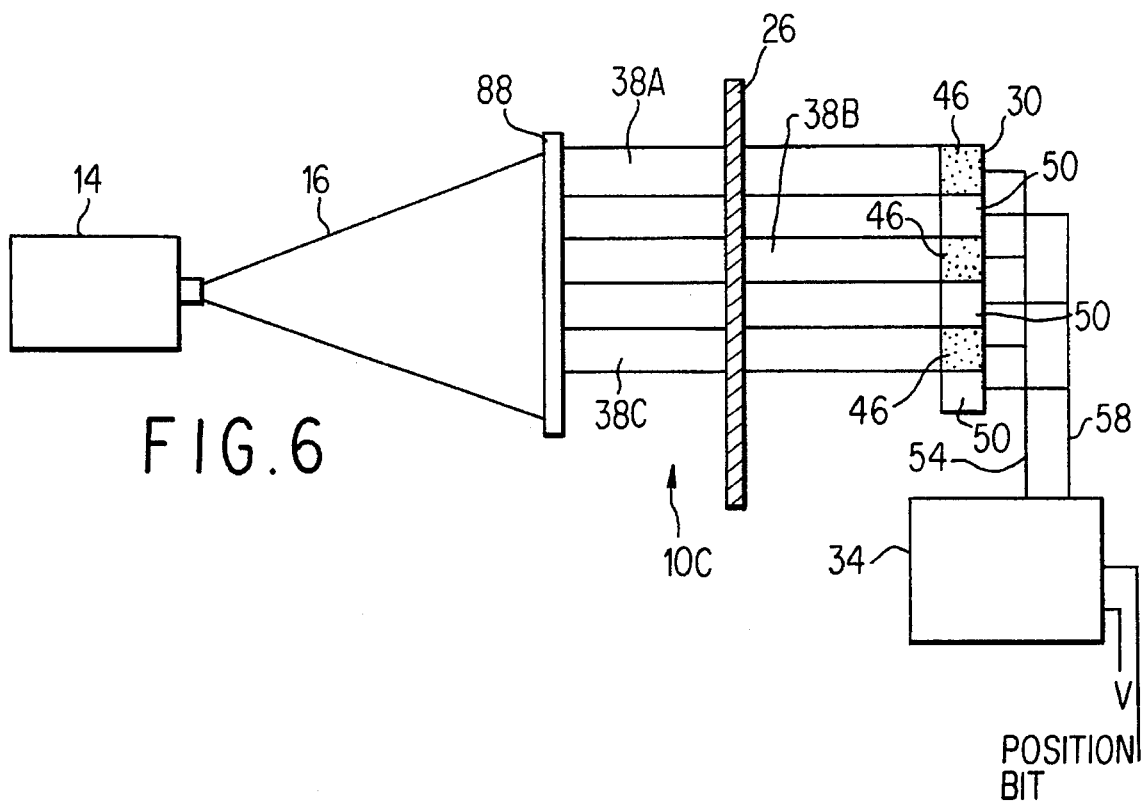
FIG. 6 is a side cross-sectional view of another alternative embodiment of a position tracking system according to the present invention.
Figure 7:
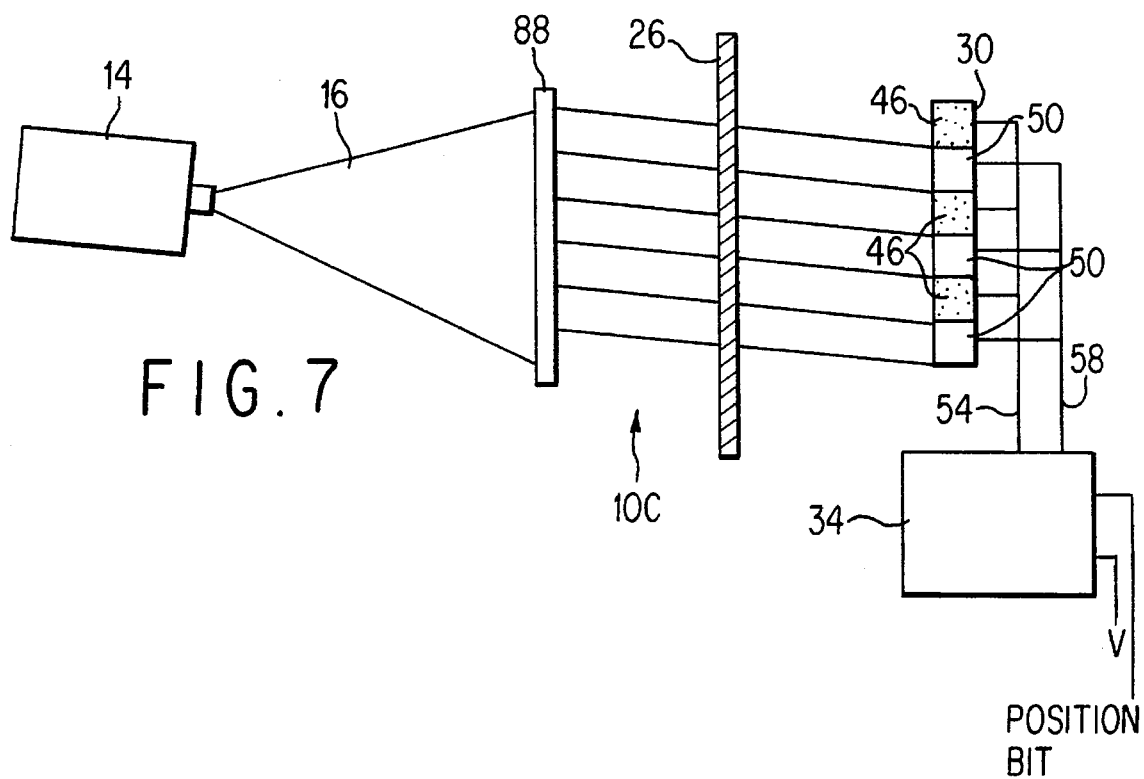
FIG. 7 is a side cross-sectional view of the alternative embodiment of the present invention shown in FIG. 5 wherein the radiation source is disposed at a different radial location relative to the radiation sensor.

FIGS. 6 and 7 are side cross-sectional views of another alternative embodiment of a position tracking system 10C according to the present invention. This embodiment is similar to the embodiment shown in FIG. 2 except that grating 58 has been replaced by a grating 88 which is constructed like radiation grating 76 shown in FIG. 5. Consequently, a plurality of discrete beams 38A, 38B and 38C are directed toward radiation sensor 30. The beams typically are of the same size as, or smaller than, sensor elements 46 and 50, and operation of this system is the same as the embodiment shown in FIGS. 1 and 2 except that more beams are sensed. Thus, when radiation source 14 is in the position shown in FIG. 6, a "0" is generated by position data generator 34, and when radiation source 14 is in the position shown in FIG. 7, a "1" is generated by position generator 34.

Figure 8:
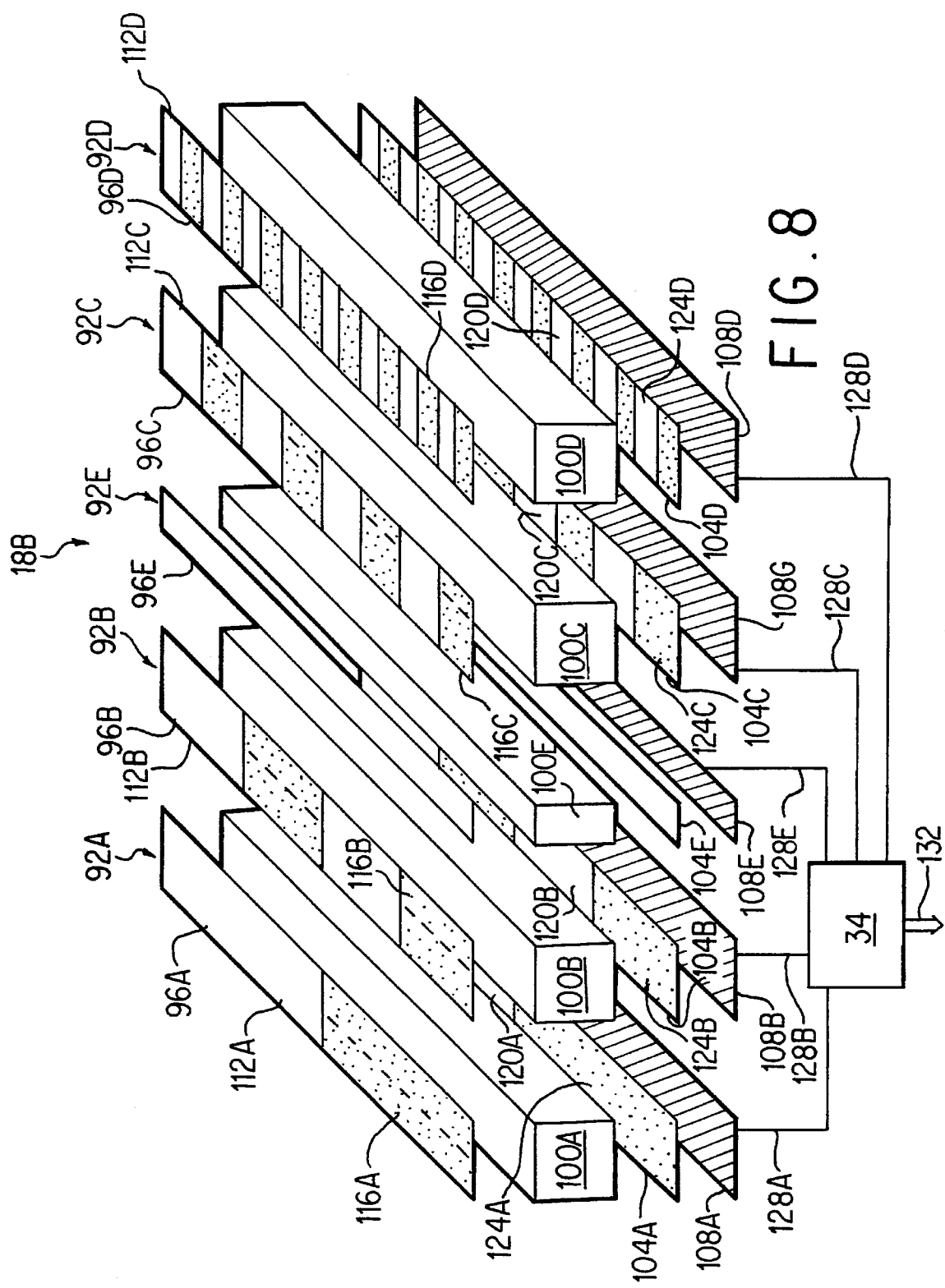
FIG. 8 is a exploded perspective view of an alternative embodiment of a position detecting unit according to the present invention.
Figure 9:
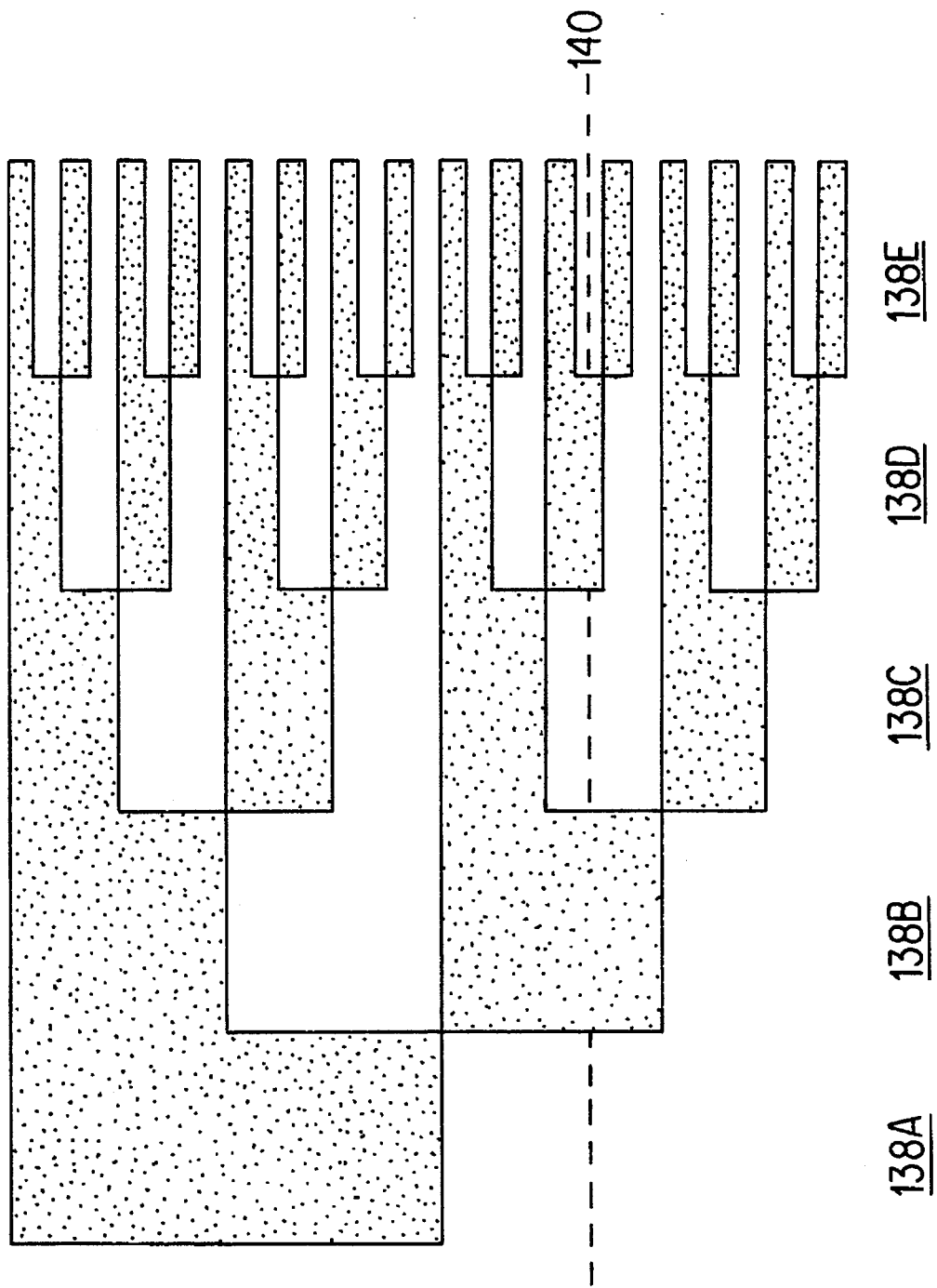
FIG. 9 is a diagram showing radiation patterns emitted by the radiation detecting unit shown in FIG. 7.

FIG. 8 is an exploded perspective view of an alternative embodiment of a position detector 18B according to the present invention. In this embodiment, position detector 18B comprises a plurality of sensor columns 92A–92E. As shown in FIG. 8, each sensor column 92A–92D comprises first radiation receiving members 96A–96D, spacers 100A–100D, second radiation receiving members 104A–104D and radiation sensing members 108A–108D. Each first radiation receiving member 96A–96D has one or more radiation transparent regions 112A–112D alternating with radiation opaque regions 116A–116D. Similarly, each second radiation receiving member 104A–104D has one or more radiation transparent regions 120A–120D alternating with radiation opaque regions 124A–124D. Spacers 100A–100D are provided so that, if the incident radiation hits the sides of a spacer, it is reflected either by total internal reflection or by a reflective coating applied to the sides of the spacer. This reduces the system sensitivity to angular positions in the direction in which it is not measuring. Thus, all radiation, minus any losses caused by reflection, which passes through the transparent regions in the plurality of first radiation receiving members 96A–96D impinges upon second radiation receiving members 104A–104D. A special sensor column 92E may be used as a reference sensor. Sensor column 92E comprises a first radiation transparent receiving member 96E, a spacer 100E, a second radiation transparent receiving member 104E, and a radiation sensor element 108E.

Each sensor column 92A–92D and sensor column 92E are coupled to position data generator 34 through corresponding lines 128A–128E. Position detector 34 operates in the same manner as the other embodiments described, except that each sensor column provides its own raw position data. As shown in FIG. 8, the length of the radiation transparent regions 112A–112D and radiation opaque regions 116A–116D progressively decrease by a factor of 2. Consequently, the signal provided by each sensor column changes states twice as fast as the signal provided by the sensor column to its left. As a result, position data generator 34 generates a signal on a position data bus 132 (e.g., 1101) that is a binary representation of the absolute radial position of radiation source 14 relative to position detector 18.

The principle of operation of position detector 18B may be used with a radiation line or band generating element such as cylindrical lens 22 or grating 58 as shown in FIGS. 1, 2 and 4. In that case, the first radiation receiving members 96A–96D and spacers 100A–100D shown in FIG. 8 may be omitted, thus leaving second radiation receiving members 104A–104D and sensor elements 108A–108D. Operation of this embodiment may be understood by referring to FIG. 8, which shows an example of five sensor columns 138A–138E. A line or band of radiation 140 is shown impinging upon columns 138A–138E. The output of position data generator 134 thus will be "10101." This binary value will increase and decrease as the beam moves up and down the columns.

FIGS. 10A and 10B illustrate an alternative embodiment of position sensor 18B. In this embodiment, only two sensor columns 160A and 160B are provided. For simplicity, only an upper radiation receiving member 164A and a lower radiation receiving member 164B is shown. In this embodiment, the spacial frequency of the radiation transparent and opaque regions are the same, except that the radiation opaque and transparent regions in sensor column 160A are offset from the radiation opaque and transparent regions in sensor column 160B of lower radiation receiving member 164B. Thus, as radiation source 14 moves radially, the data will progress to 01 to 10 to 01, etc.

The net result of each of the foregoing embodiments is a position tracking system which tracks angular movement in one direction. The direction is determined by the orientation of position detector 18. By combining two or more position detectors, a multidimensional position tracker may be constructed. For example, FIG. 11 shows a simplified illustration of a computing system 180 which incorporates the teachings of the present invention. Computing system 180 includes a display 182 and a wand 184 for controlling the position of a wand or other shaped cursor 186. Wand 184 includes radiation source 188 and position detectors 190, 192 and 194. Display 182 includes a radiation source 196 and position detectors 198, 200 and 202. Radiation source 188 and position detectors 198, 200 and 202 are used to determine the X, Y and Z coordinates of wand 184 in coordinate system 204, whereas radiation source 196 and position detectors 190, 192 and 194 are used to determine the yaw, pitch and roll of wand 184.

To determine the position of wand 184 in coordinate system 204, position detectors 198 and 202 are oriented horizontally and spaced apart from each other. Position detector 200 is oriented vertically. Either one of position detectors 198 and 202 may be used for determining the position of radiation source 188 along the X axis of coordinate system 204. Position detector 200 is used for detecting the position of radiation source 188 along the Z direction of coordinate system 204. Position detectors 198 and 202 may be used for determining the position of radiation source 188 along the Y axis using triangulation methods. Radiation source 196 and detectors 190, 192 and 194 are used to detect the roll, pitch and yaw of 184 in a similar manner. In this case, position sensor 192 is oriented orthoganally to position sensors 190 and 194.

While the above is a complete description of a preferred embodiment of the present invention, various modifications can be employed. For example, the slot and lens assemblies used for directing the discrete beam of light toward the radiation sensor may be replaced by a system of lenses, a holographic optical element, a system of holographic optical elements, a combination of holographic optical elements and conventional optical elements, or any means appropriate for patterning radiation of the wave length of interest. One or more radiation sources may be employed, and they may be employed using time- or frequency-division multiplexing. Cursor control in zero, one, two or three dimensions of position and zero, one, two or three dimensions of orientation may be achieved. The teachings of the present invention may be employed in cooperative or competitive interactive computer games because the computer knows the position and orientation of each of the action figures in the playing field. The teachings of the present invention may be applied to virtual realities, head tracking, body tracking, etc. Multiple radiation sources and position detectors may be disposed on a body suit or on different limbs of the user to properly model the position and orientation of the user. Consequently, the full scope of the invention should be ascertained by the appended claims.

What is claimed is:

1. A position sensor, comprising:

a first radiation source;

a first radiation sensor, a second radiation sensor, and a third radiation sensor, each of said radiation sensors having a respective radiation sensing surface which detects radiation emitted from the first radiation source;

a radiation director disposed between a line of sight between the first radiation source and each of said radiation sensors;

wherein the three radiation sensors each include a respective signal emitting means which emits a respective position indicating signal which varies in response to the location of the first radiation source, relative to the respective radiation sensing surface, each of said position indicating signals indicating a different direction;

said position sensor further comprising:

a second radiation source mounted to a same mounting device as the first, second, and third radiation sensors are mounted to;

a fourth radiation sensor, a fifth radiation sensor, and a six radiation sensor, each of said fourth, fifth and sixth radiation sensors having a respective radiation sensing surface which detects radiation emitted from the second radiation source, said fourth, fifth, and sixth radiation sensors each mounted to a same mounting device as said first radiation source is mounted to;

wherein the fourth, fifth, and sixth radiation sensors each include a respective signal emitting means which emits a respective position indicating signal which varies in response to the location of the second radiation source, relative to the respective radiation sensing surface.

2. A position detector according to claim 1, wherein said six radiation sensors and the respective signal emitting means are arranged to detect an x position, y position, z position, roll, pitch, and yaw of said mounting device.

* * * * *